(12) United States Patent
Chang (10) Patent No.: US 7,436,617 B2
(45) Date of Patent: Oct. 14, 2008

(54) CONTROLLER, STATE ESTIMATOR AND METHODS FOR USE THEREWITH

(75) Inventor: Michael Chang, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 255 days.

(21) Appl. No.: 11/472,229

(22) Filed: Jun. 21, 2006

(65) Prior Publication Data

US 2008/0010498 A1    Jan. 10, 2008

(51) Int. Cl.
*G11B 21/02*    (2006.01)
*G11B 5/596*    (2006.01)

(52) U.S. Cl. .................. 360/75; 360/77.04; 318/560

(58) Field of Classification Search .................. None
See application file for complete search history.

(56) References Cited

U.S. PATENT DOCUMENTS

| | | | |
|---|---|---|---|
| 4,616,276 A | 10/1986 | Workman | |
| 4,628,379 A | 12/1986 | Andrews, Jr. et al. | |
| 5,404,253 A | 4/1995 | Painter | |
| 5,585,976 A | 12/1996 | Pham | |
| 5,886,846 A | 3/1999 | Pham et al. | |
| 6,023,390 A | 2/2000 | Kang | |
| 6,088,186 A | 7/2000 | Carlson | |
| 6,347,018 B1 * | 2/2002 | Kadlec et al. | 360/77.08 |
| 6,961,627 B2 * | 11/2005 | Takenaka | 700/34 |
| 6,999,263 B1 * | 2/2006 | Melkote et al. | 360/75 |
| 7,092,856 B1 * | 8/2006 | Hojo et al. | 703/2 |

OTHER PUBLICATIONS

Francis, et al; "The Internal Model Principle of Control Theory";Automatica, vol. 12, pp. 457-465; Pergamon Press, 1976; Printed in Great Britain.
Davison, et al; "Robust Control of a General Servomechanism Problem: The Servo Compensator"; Automatica, vol. 11, pp. 461-471; Pergamon Press, 1975; Printed in Great Britain.
Edward J. Davison; "The Robust Control of a Servomechanism Problem for Linear Time-Invariant Multivariable Systems";IEEE Transactions on Automatic Control, vol. AC-21, No. 1; Feb. 1976: pp. 25-34.
Edward J. Davison; "Multivariable Tuning Regulators: The Feedforward and Robust Control of a General Servomechanism Problem";IEEE Transactions on Automatic Control, vol. AC-21. No. 1. Feb. 1976: pp. 35-47.

* cited by examiner

*Primary Examiner*—Joseph Feild
*Assistant Examiner*—Jason Olson
(74) *Attorney, Agent, or Firm*—Garlick Harrison & Markison; Bruce E. Stuckman (57) ABSTRACT

A controller is disclosed that can be used in controlling a drive device of a disk drive, or other systems, in the presence of sinusoidal disturbances. The controller includes a calibration module that generates a plurality of reference states for a reference region of a disk of the disk drive. An initialization state generation module generates a plurality of initialization states for at least one other region of the disk as a function of the plurality of reference states, a displacement between the other regions of the disk and the reference region of the disk, and a reference state transition matrix. A control module generates a control signal for the drive device based on the plurality of initialization states.

30 Claims, 9 Drawing Sheets

CONTROLLER, STATE ESTIMATOR AND METHODS FOR USE THEREWITH

BACKGROUND OF THE INVENTION

1. Technical Field of the Invention

The present invention relates to controllers, disk drives, and related methods.

2. Description of Related Art

As is known, many varieties of disk drives, such as magnetic disk drives, are used to provide data storage for a host device, either directly, or through a network such as a storage area network (SAN) or network attached storage (NAS). Typical host devices include stand alone computer systems such as a desktop or laptop computer, enterprise storage devices such as servers, storage arrays such as a redundant array of independent disks (RAID) arrays, storage routers, storage switches and storage directors, and other consumer devices such as video game systems and digital video recorders. These devices provide high storage capacity in a cost effective manner.

Disk drives include one or more drive devices, such as the spindle motor that spins the disk at a substantially constant velocity, and the actuator that positions one or more read/write heads over the surface of the disk. The demand for increased spin rates, higher recording and storage densities, and faster access times provides challenges for these corresponding controllers to provide fast and accurate control of these respective drive devices. Moreover, when the disk is mounted or potentially shifted in the drive, any resultant offset in the disk from its original relative center additionally will result in sinusoidal harmonic disturbances in the measured track position. Prior art controllers have attempted to compensate for these sinusoidal variations by calculating, for instance, a control effort based upon sinusoidal and cosinusoidal look-up table values on a wedge-by-wedge basis. This requires, among others, both the time to process and retrieve these wedge-dependent values, and the space to accommodate and store a large enough table to provide accurate and precise real-time control. Further limitations and disadvantages of conventional and traditional approaches will become apparent to one of ordinary skill in the art through comparison of such systems with the present invention.

SUMMARY OF THE INVENTION

The present invention sets forth a controller, state estimator, and methods for use therewith substantially as shown in and/or described in connection with at least one of the figures, as set forth more completely in the claims that follow.

DETAILED DESCRIPTION OF THE INVENTION INCLUDING THE PRESENTLY PREFERRED EMBODIMENTS

Figure 1:
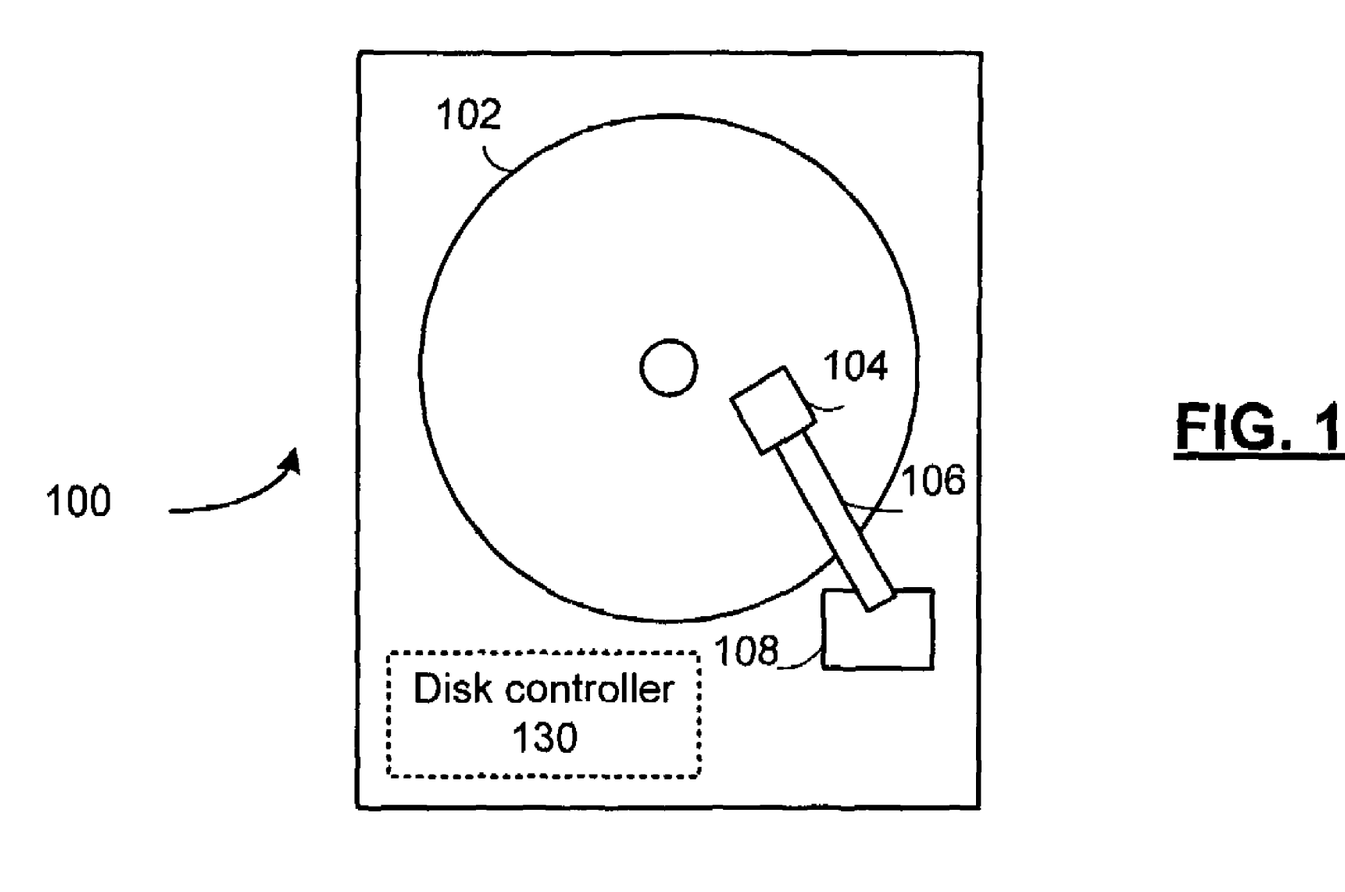
FIG. 1 presents a pictorial representation of a disk drive unit 100 in accordance with an embodiment of the present invention.

FIG. 1 presents a pictorial representation of a disk drive unit 100 in accordance with an embodiment of the present invention. In particular, disk drive unit 100 includes a disk 102 that is rotated by a spindle motor (not specifically shown) at a velocity such as 3,600 revolutions per minute (RPM), 4,200 RPM, 4,800 RPM, 5,400 RPM, 7,200 RPM, 10,000 RPM, or 15,000 RPM; however, other velocities including greater or lesser velocities may likewise be used, depending on the particular application and implementation in a host device. In an embodiment of the present invention, disk 102 can be a magnetic disk that stores information as magnetic field changes on some type of magnetic medium. The medium can be rigid or nonrigid, removable or nonremovable, that consists of or is coated with magnetic material.

Disk drive unit 100 further includes one or more read/write heads 104 that are coupled to arm 106 that is moved by actuator 108 over the surface of the disk 102 either by translation, rotation, or both. In an embodiment of the present invention, the read/write heads 104 include a write element, such as a monopole write element that writes data on the disk with perpendicular magnetic recording (PMR), longitudinal magnetic recording (LMR), or other recording orientation. This allows for greater recording density and greater storage capacity for the drive. However, other recording configurations can likewise be used within the broad scope of the present invention. A disk controller 130 is included for controlling the read and write operations from and to the drive, for controlling the speed of the spindle motor and the motion of actuator 108, and for providing an interface to and from the host device.

Disk 102 is recorded during an initialization or manufacturing process, either in the factory when the disk drive 100 is manufactured, or during some disk initialization, reformatting, or recovery operation. A plurality of wedges, such as servo wedges, servo spirals, or other servo data fields (not specifically shown) are written on the disk 102. These wedges can be linear; however, non-linear configurations including spirals and arcs can also be employed, particularly when disk 102 is implemented in a disk drive, such as disk drive unit 100 that includes an arm 106 that is moved by actuator 108 over the surface of the disk 102 by angular displacement.

Each wedge typically includes a servo field associated with each track and usually each relative rotational position of the disk. One or more sectors of user or control data can be stored along the track between consecutive wedges. In particular, a servo field typically begins with control data that includes a preamble and synchronization mark that allow the disk controller to recognize the beginning of the servo field and the beginning of the servo data. An index mark can optionally be included in the control data to indicate a particular wedge that is the first or "index" wedge for easy decoding by the disk controller. Servo data includes track identification data for identifying the particular track location, burst data for providing subtrack head alignment data that facilitates control to a track centerline or other reference track position and facilitates track seek movements of the read/write head, etc. In addition, a servo address mark is used for timing generation in the disk controller 130 to time the start time for various events, such as write operations, synchronous identification of a wedge during spin-up and spinning of the disk, etc. While not shown, the servo data can also include other data including, for instance, a head number for a multi-head disk drive, and a wedge number that identifies the relative rotational position of the disk, etc. This data may or may not be additionally encoded via other encryption methods.

Disk controller 130 includes a controller and/or state estimator in accordance with one or more functions or features of the present invention, as described in further detail in conjunction with the figures that follow.

Figure 2:
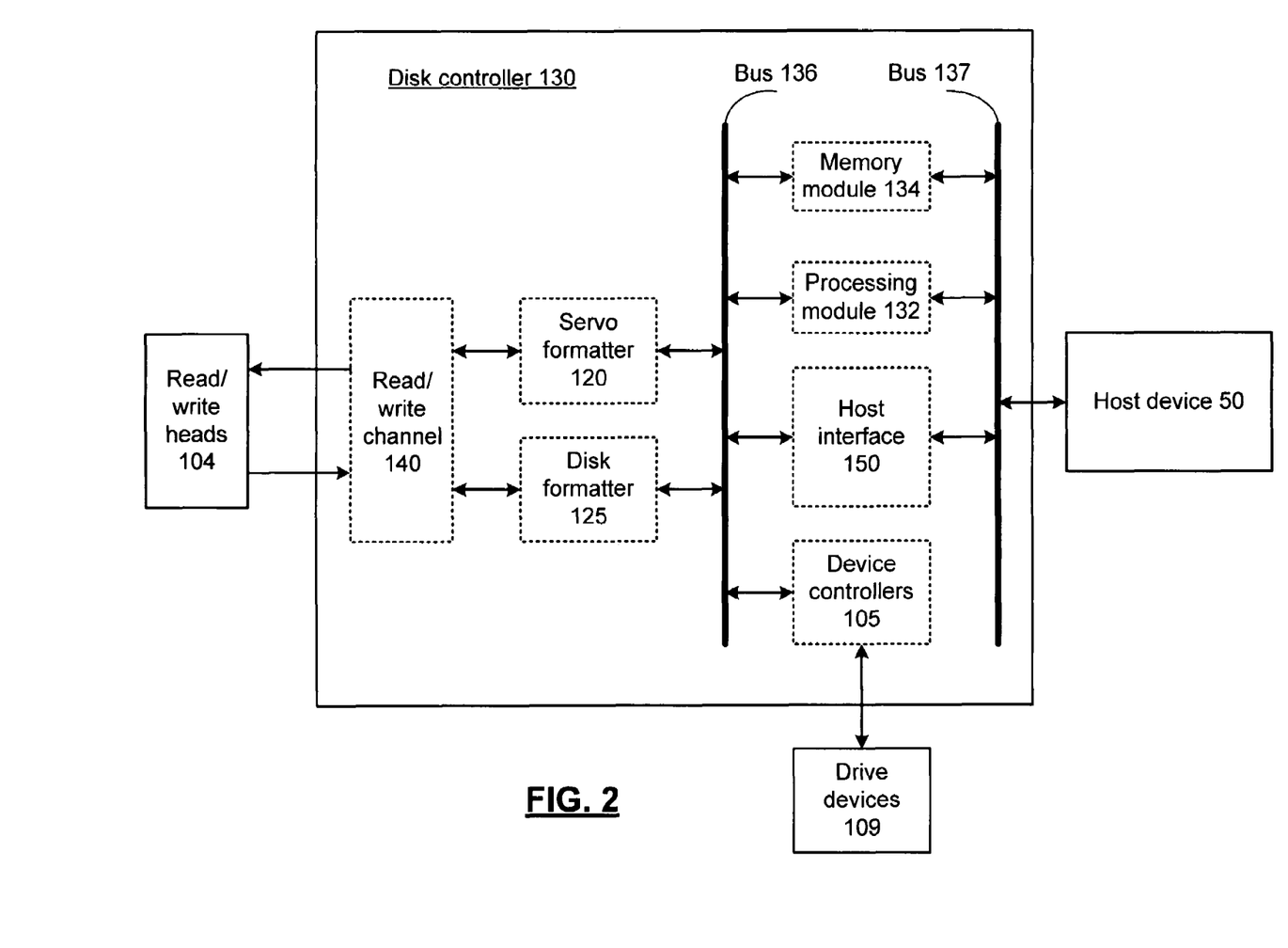
FIG. 2 presents a block diagram representation of a disk controller 130 in accordance with an embodiment of the present invention.

FIG. 2 presents a block diagram representation of a disk controller 130 in accordance with an embodiment of the present invention. In particular, disk controller 130 includes a read/write channel 140 for reading and writing data from and to disk 102 through read/write heads 104. Disk formatter 125 is included for controlling the formatting of data and for providing clock signals and other timing signals that control the flow of the data written to, and the data read from disk 102. In particular, read/write channel 140 is coupled to the read/write heads 104 to read the servo data from the disk. Servo formatter 120 is coupled to the read/write channel 140 to generate timing and position signals based on the servo data that is read, so that device controllers 105 can control the operation of the plurality of drive devices based on the timing and position signals.

In an embodiment of the present invention, the read/write channel 140 includes a repetition decoder, majority logic decoder, matched filter, correlator, integrator and/or maximum likelihood detector for decoding Gray-coded track identification data and the burst data. From this servo data, the track number is extracted by Gray-decoding the track identification data. In addition, subtrack position is determined based on the relative magnitudes and/or phases of a plurality of servo bursts. Further details regarding the subtrack control and positioning are presented in U.S. Pat. No. 6,108,151, Sampled Amplitude Read Channel for Reading User Data and Embedded Servo Data from a Magnetic Medium, filed on Apr. 25, 1997. In particular, the track information decoded from the servo data and the subtrack position determined based upon the servo bursts can be used by a controller, such as one of device controllers 105, to control the actuator used to position the read/write heads 104.

In addition, the servo formatter 120 generates timing information based on the detected servo address mark for use by device controllers 105 for controlling the actuator 108 and spindle motor, and optionally for generating other timing information used by disk formatter 125 and read/write channel 140 in the timing of disk read and/or write operations. Further details regarding the use of servo address mark in such timing operations are presented in pending U.S. patent applications Disk controller and methods for use therewith, having Ser. No. 11/311,725; Media event timer and methods for use therewith, having Ser. No. 11/311,727; and Read/write timing generator and methods for use therewith, having Ser. No. 11/311,726. In particular, the timing of detected servo address marks can be used by a controller, such as one of device controllers 105, to control the velocity of the spindle motor that spins the disk 102.

Host interface 150 receives read and write commands from host device 50 and transmits to the host device data read from disk 102 along with other control information in accordance with a host interface protocol. In an embodiment of the present invention the host interface protocol can include small computer system interface (SCSI), serial advanced technology attachment (SATA), enhanced integrated drive electronics (EIDE), or any number of other host interface protocols, either open or proprietary that can be used for this purpose.

Disk controller 130 further includes a processing module 132 and memory module 134. Processing module 132 can be implemented using one or more microprocessors, micro-controllers, digital signal processors, microcomputers, central processing units, field programmable gate arrays, programmable logic devices, state machines, logic circuits, analog circuits, digital circuits, and/or any devices that manipulate signals (analog and/or digital) based on operational instructions that are stored in memory module 134. When processing module 132 is implemented with two or more devices, each device can perform the same steps, processes, or functions in order to provide fault tolerance or redundancy. Alternatively, the functions, steps, and processes performed by processing module 132 can be split between different devices to provide greater computational speed and/or efficiency.

Memory module 134 may be a single memory device or a plurality of memory devices. Such a memory device may be a read-only memory (ROM), random access memory (RAM), volatile memory, non-volatile memory, static random access memory (SRAM), dynamic random access memory (DRAM), flash memory, cache memory, and/or any device that stores digital information. Note that when the processing module 132 implements one or more of its functions via a state machine, analog circuitry, digital circuitry, and/or logic circuitry, the memory module 134 storing the corresponding operational instructions may be embedded within, or be external to, the circuitry comprising the state machine, analog circuitry, digital circuitry, and/or logic circuitry. Further note that the memory module 134 stores, and the processing module 132 executes, operational instructions that can correspond to one or more of the steps, processes, methods, and/or functions illustrated herein.

Disk controller 130 includes a plurality of modules, in particular, device controllers 105, processing module 132, memory module 134, read/write channel 140, disk formatter 125, servo formatter 120, and host interface 150 that are interconnected via buses 136 and 137. Each of these modules can be implemented in hardware, firmware, software, or a combination thereof, in accordance with the broad scope of the present invention. While a particular bus architecture is shown in FIG. 2 with buses 136 and 137, alternative bus architectures that include either a single bus configuration or additional data buses, further connectivity, such as direct connectivity between the various modules, are likewise possible to implement the features and functions included in the various embodiments of the present invention.

In an embodiment of the present invention, one or more modules of disk controller 130 are implemented as part of a system-on-a-chip (SoC) integrated circuit. In an embodiment of the present invention, this system-on-a-chip integrated circuit includes a digital portion that can include additional modules, such as protocol converters, linear block code encoding and decoding modules, etc., and an analog portion that can include additional modules, such as a power supply, disk drive motor amplifier, disk speed monitor, read amplifiers, etc. In a further embodiment of the present invention, the various functions and features of disk controller 130 are implemented in a plurality of integrated circuit devices that communicate and combine to perform the functionality of disk controller 130.

Figure 3:
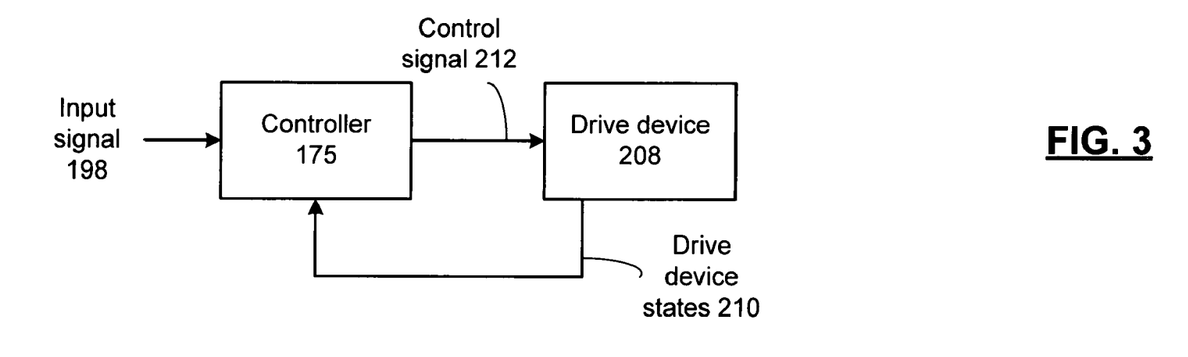
FIG. 3 presents a block diagram representation of a controller 175 and drive device 208 in accordance with an embodiment of the present invention.

FIG. 3 presents a block diagram representation of a controller 175 in accordance with an embodiment of the present invention. In particular, controller 175, such as one of the device controllers 105, is presented for use in controlling a drive device 208, such as actuator 108 or one of the other drive devices 109 of disk drive 100. Controller 175 generates one or more control signals 212 for controlling the operation of drive device 208 based on one or more input signals 198 and one or more system states, such as drive device states 210, control states 211 (that are shown in conjunction with FIG. 4), or other states that are either measured directly or estimated via state estimation techniques such as Kalman filters, Luenberger observers, etc. Controller 175 regulates one or more outputs of the drive device 208, such as the position of the read/write heads or the velocity of the disk drive motor, that can be represented by one or more of the system states, to track a reference signal such as input signal 198.

Controller 175 provides a simple and effective robust controller that results in reduced computation time and complexity, increased precision, and enhanced regulation of the drive device 208 when subject to sinusoidal disturbances having possibly unknown magnitudes and phases. Further details regarding controller 175 are presented in conjunction with FIG. 4 that follows.

Figure 4:
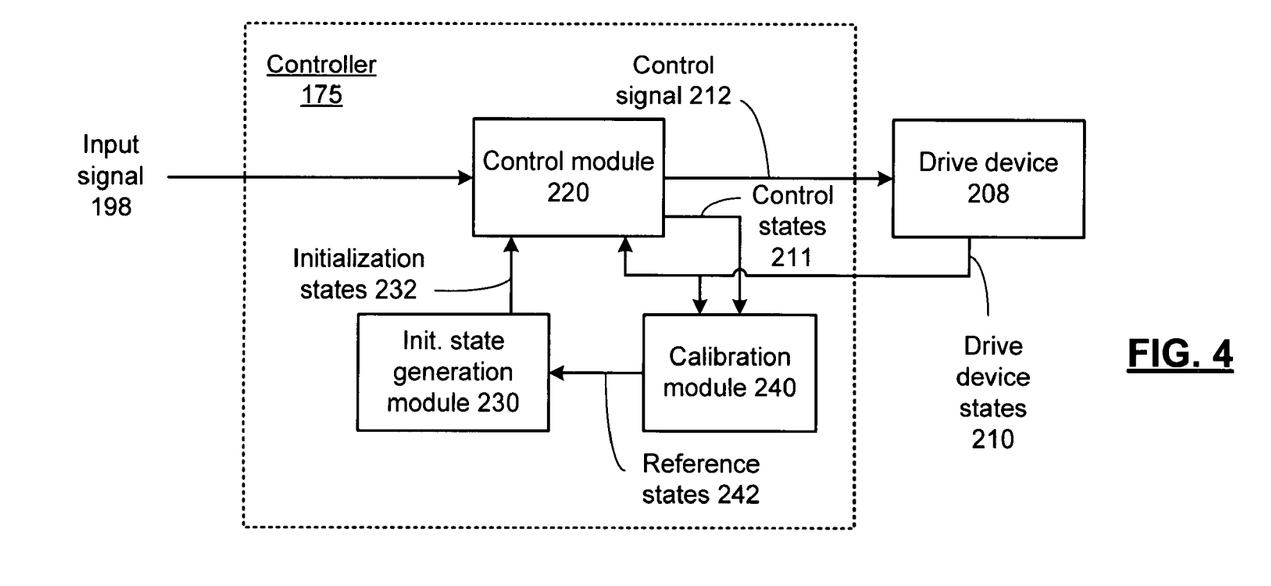
FIG. 4 presents a block diagram representation of a controller 175 in accordance with an embodiment of the present invention.

FIG. 4 presents a block diagram representation of a controller 175 in accordance with an embodiment of the present invention. Controller 175 includes a control module 220 that generates control signal 212 for drive device 208 based on a plurality of initialization states 232 and system states, such as drive device states 210. Particular methodologies including necessary and sufficient conditions for the design of the control module 220 are presented in E. J. Davison and A. Goldenberg, "Robust Control of a General Servomechanism Problem: The Servo Compensator," *Automatica*, Vol. 11, 1975; E. J. Davison, "The Robust Control of a Servomechanism Problem for Linear Time-Invariant Multivariable Systems", *IEEE Transactions on Automatic Control*, Vol. AC-21, No. 1, February 1976; E. J. Davison, "Multivariable Tuning Regulators: The Feedforward and Robust Control of a General Servomechanism Problem", *IEEE Transactions on Automatic Control*, Vol. AC-21, No. 1, February 1976; and B. A. Francis and W. M. Wonham, "The Internal Model Principle of Control Theory," *Automatica*, Vol. 12, 1976; however, other feedback and/or feedforward control methodologies can likewise be employed, including, for instance, proportional-integral-derivative (PID) control, pole placement control, state space control, transfer function control, optimal control such as minimum variance, linear quadratic regulators, $H_2$, $H_\infty$ optimal control, etc., or any of a wide variety of other controller design techniques or topologies. Controller 175 further includes an initialization state generation module 230 that generates the initialization states 232 based on a plurality of reference states 242 from calibration module 240.

Calibration module 240 generates the reference states 242 for a reference region of a disk 102 of the disk drive 100. In an embodiment of the present invention, the reference region of the disk 102 is defined by a head, wedge, and zone location, wherein a zone includes i tracks of the disk where i is greater than 0. In particular, calibration module 240 operates during a calibration of the disk drive 100 during manufacturing, during recalibration, such as a self-recalibration of the disk drive 100, or during normal operations of the drive, to determine and store reference values of the system states for a reference wedge for each head and zone of disk 102. Reference states 242 can be determined by initializing control module 220 with a set of default initialization states, commanding the controller with input signal 198 to move the particular head to the zone of the reference region of disk 102, and allowing the control module 220 to reach steady-state conditions at this reference region. The resulting system states corresponding to this reference region are recorded as the reference states 242 for this head, zone, and reference wedge. The procedure can be repeated for the reference wedges of other zones and heads for one or more harmonic values.

Initialization state generation module 230 generates initialization states 232 for at least one other region of the disk as a function of the plurality of reference states 242, a displacement between the other regions of the disk and the reference region of the disk, and a reference state transition matrix. In an embodiment of the present invention, the initialization state generation module 230 generates the initialization states 232 based on the equation:

$$\zeta(\lambda_i, k) = A^{\lambda_i - \lambda_o} \zeta(\lambda_o, k)$$

wherein $A^{\lambda_i - \lambda_o}$ represents a reference state transition matrix for a displacement $\lambda_i - \lambda_o$, k represents a discrete-time index, $\zeta(\lambda_o, k)$ represents the plurality of reference states for the reference wedge number $\lambda_o$, and $\zeta(\lambda_i, k)$ represents the plurality of initialization states for the other regions having wedge number $\lambda_i$, within the same zone and with the same head.

Initialization state generation module 230 generates a reference state transition matrix for at least one harmonic of the sinusoidal disturbance. In a particular embodiment wherein the n'th harmonic of a sinusoidal disturbance has a radian frequency $\omega = 2\pi n/(\alpha T)$, where $\alpha$ is a non-zero constant and T is the sampling period of the discrete-time system, the reference state transition matrix for the n'th harmonic can be calculated as:

$$A^\lambda(n) = A^\lambda(n)$$

where $$A^\lambda(n) = \csc(2\pi n/\alpha) \begin{bmatrix} \sin(2\pi n(\lambda+1)/\alpha) & \mu\sin(2\pi n\lambda/\alpha) \\ -\sin(2\pi n\lambda/\alpha)/\mu & \sin(2\pi n(1-\lambda)/\alpha) \end{bmatrix}$$

wherein $\mu$ is a non-zero constant value, with, for instance, $\mu=1$, and $\lambda$ is any complex-valued scalar. Considering, for example, a controller that rejects the first n non-zero integral harmonics of a sinusoidal disturbance, the reference state transition matrix can be calculated as:

$$A^\lambda(n) = \text{block diagonal}(A^\lambda(1), A^\lambda(2), \ldots, A^\lambda(n))$$

with all off-diagonal block matrix entries set to be equal to zero. Considering the example where n=2, the reference state transition matrix can be represented as:

$$A^\lambda(n) = \begin{bmatrix} \kappa(1)\sin(2\pi(\lambda+1)/\alpha) & \kappa(1)\mu\sin(2\pi\lambda/\alpha) & 0 & 0 \\ -\kappa(1)\sin(2\pi\lambda/\alpha)/\mu & \kappa(1)\sin(2\pi(1-\lambda)/\alpha) & 0 & 0 \\ 0 & 0 & \kappa(2)\sin(4\pi(\lambda+1)/\alpha) & \kappa(2)\mu\sin(4\pi\lambda/\alpha) \\ 0 & 0 & -\kappa(2)\sin(4\pi\lambda/\alpha)/\mu & \kappa(2)\sin(4\pi(1-\lambda)/\alpha) \end{bmatrix}$$

where $\kappa(n)\csc(2\pi n/\alpha)$.

While particular reference state transition matrices are shown above, other matrices, including those obtained upon performing similarity transformations on the above matrices and having resulting eigenvalues in common or substantially in common, or other matrices having at least one common eigenvalue or substantially common eigenvalue, may likewise be used. It should be noted that the above reference state transition matrices are relatively sparse. The cosecant term is a constant for each value of n and can be calculated and stored in advance. In addition, while some of the elements include a sinusoidal term, no cosinusoidal terms need to be processed, stored, or retrieved in real-time.

Further, while the reference state transition matrix above is formulated for the first n non-zero integral harmonics, selected harmonics can be omitted from or included in the control scheme by respectively omitting or including the corresponding diagonal term $A^\lambda(n)$. For instance, sinusoidal disturbances that include only odd harmonics 1, 3, 5, and 7 can be included based on a reference state transition matrix such as $A^\lambda = \text{block diagonal}(A^\lambda(1), A^\lambda(3), A^\lambda(5), A^\lambda(7))$. Likewise, sinusoidal disturbances that include only harmonics 1, 2, and 23 can be included based on a reference state transition matrix such as $A^\lambda = \text{block diagonal}(A^\lambda(1), A^\lambda(2), A^\lambda(23))$. Moreover, while integer harmonics are presented above, non-integer values of n can likewise be implemented for situations where non-integer harmonic disturbances need to be rejected. It should also be noted that each harmonic could have different corresponding values of $\mu$, for instance, $\mu_n$, for the n'th harmonic. Also, the block diagonal elements of the reference state transition matrix need not be arranged monotonically as presented above and can be arranged in any arbitrary order. In addition, the present invention can be used in multi-input multi-output systems with increased dimensionality to include each input, each output, and the harmonic disturbances thereto.

In this fashion, the initialization states 232 for the control module 220 can be calculated in closed form for other regions of disk 102 based on the reference state transition matrix and the stored reference states 242. No cosine table is needed. In addition, the linear formulation of the equations above lend themselves to linear systems that can be addressed with numerous powerful analytical techniques. Initialization state generation module 230 and calibration module 240 can be implemented in a processor such as processing module 132 or a dedicated processing element that includes one or more microprocessors, micro-controllers, digital signal processors, microcomputers, central processing units, field programmable gate arrays, programmable logic devices, state machines, logic circuits, analog circuits, digital circuits, and/or any devices that manipulate signals (analog and/or digital) based on operational instructions that are stored in a memory, such as memory module 134 or other memory element operating in conjunction with one or more input/output devices.

In an embodiment of the present invention, control module 220 generates a control signal 212 that includes a feedforward control u(k) that is based on the following equations:

$$\zeta(\lambda_j, k+1) = A\zeta(\lambda_i, k) + By(k)$$

$$u(k) = K\zeta(\lambda_i, k) + Dy(k)$$

wherein A represents a state transition matrix, k represents a discrete-time index, $\zeta(\lambda_i, k)$ represents the plurality of initialization states at k for other regions having a displacement $\lambda_i$, $\zeta(\lambda_j, k+1)$ represents the plurality of system states at k+1 for the other regions having a displacement $\lambda_j$, K represents a control matrix, y(k) represents at least one output of the drive device 208, u(k) represents at least one input to the drive device 208, and B and D are system matrices that can be obtained by standard state space control techniques. In an embodiment of the present invention, $\lambda_j = \lambda_i + 1$; however, other values are possible based upon whether wedge numbers increase or decrease as disk 102 rotates during operation, whether the discrete-time index corresponds to one or another number of wedges, the restarting of the wedge number through one full rotation of the disk 102, etc.

In an embodiment of the present invention, control module 220 generates a state transition matrix for at least one harmonic of the sinusoidal disturbance. In a particular embodiment wherein the n'th harmonic of a sinusoidal disturbance has a radian frequency $\omega = 2\pi n/(\alpha T)$, where $\alpha$ is a non-zero constant and T is the sampling period of the discrete-time system, the state transition matrix for the n'th harmonic can be calculated as:

$$A(n) = A(n) \text{ where } A(n) = \begin{bmatrix} 2\cos(2\pi n/\alpha) & \mu \\ -1/\mu & 0 \end{bmatrix}$$

wherein $\mu$ is a non-zero constant value, with, for instance, $\mu=1$. Considering, for example, a controller that rejects the first n non-zero integral harmonics of the sinusoidal disturbance, the state transition matrix can be calculated as:

$$A(n) = \text{block diagonal}(A(1), A(2), \ldots, A(n))$$

with all off-diagonal block matrix entries set to be equal to zero. Considering the example where n=2, the state transition matrix can be represented as:

$$A(n) = \begin{bmatrix} 2\cos(2\pi/\alpha) & \mu & 0 & 0 \\ -1/\mu & 0 & 0 & 0 \\ 0 & 0 & 2\cos(4\pi/\alpha) & \mu \\ 0 & 0 & -1/\mu & 0 \end{bmatrix}$$

While particular state transition matrices are shown above, other matrices, including those obtained upon performing similarity transformations on the above matrices and having resulting eigenvalues in common or substantially in common, or other matrices having at least one common eigenvalue or substantially common eigenvalue, may likewise be used. It should be noted that the above state transition matrices are relatively sparse. In addition, while some of the diagonal elements include constant cosinusoidal terms, these values do not need to be calculated in real time, and can be calculated and stored only once a priori.

Further, while the state transition matrix above is formulated for the first n non-zero integral harmonics, selected harmonics can be omitted from or included in the control scheme by respectively omitting or including the corresponding diagonal term A(n). For instance, sinusoidal disturbances that include only odd harmonics 1, 3, 5, and 19 can be rejected based on a state transition matrix such as A=block diagonal (A(1), A(3), A(5), A(19)). Likewise, sinusoidal disturbances that include only harmonics 1, 2, and 18 can be rejected based on a state transition matrix such as A=block diagonal(A(1), A(2), A(18)). Moreover, while integer harmonics are presented above, non-integer values of n can likewise be implemented for situations where non-integer harmonic disturbances need to be rejected. It should also be noted that each harmonic could have different corresponding values of $\mu$, for instance, $\mu_n$, for the n'th harmonic. Also, the block diagonal elements of the state transition matrix need not be arranged monotonically as presented above and can be arranged in any arbitrary order. In addition, the present invention can be used in multi-input multi-output systems with increased dimensionality to include each input, each output, and the harmonic disturbances thereto.

Figure 5:
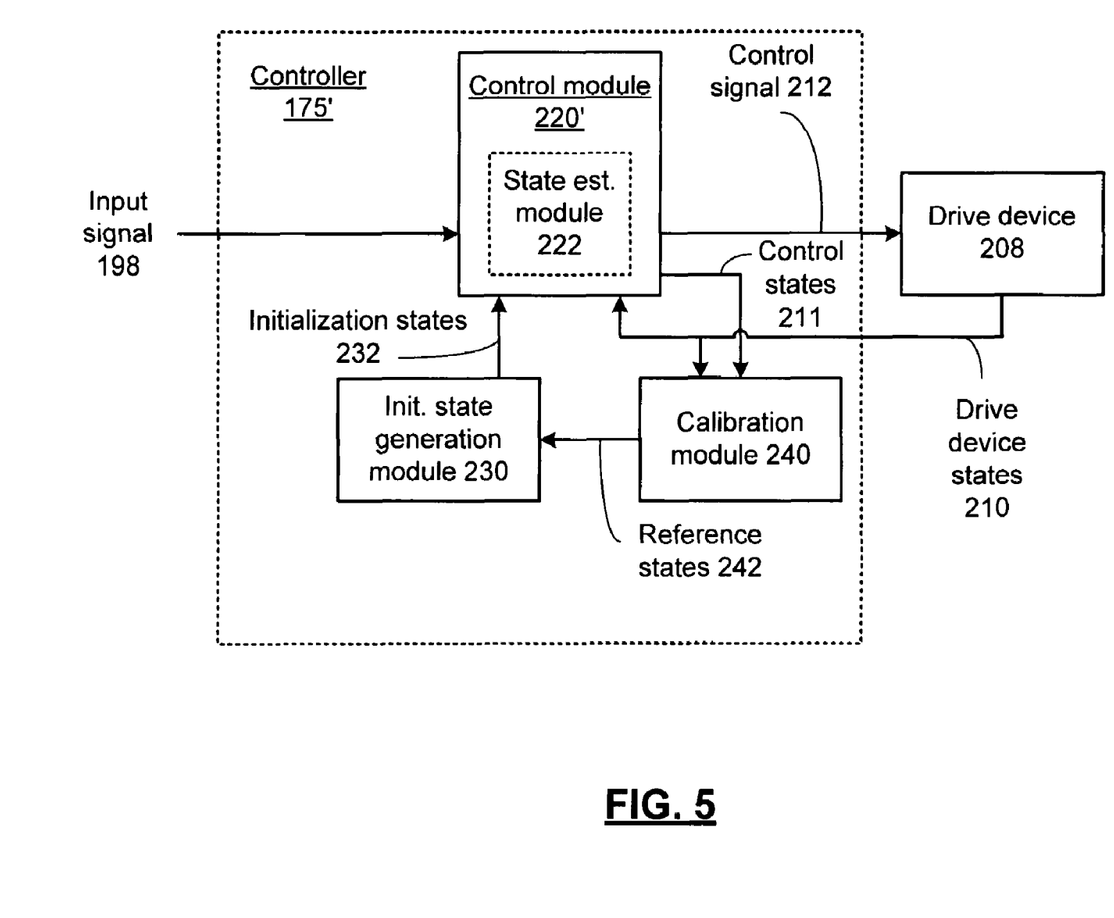
FIG. 5 presents a block diagram representation of a controller 175' in accordance with an embodiment of the present invention.

FIG. 5 presents a block diagram representation of a controller 175' in accordance with an embodiment of the present invention. In particular, controller 175' includes many common elements of controller 175 that are referred to by common reference elements. Control module 220', similar to control module 220, can be implemented using a broad range of controller design techniques. However, control module 220' includes a state estimation module 222, such as a Kalman filter, Luenberger observer, or other state estimator that estimates one or more system states based on the initialization states 232. In particular, control module 220' operates to generate control signal 212 based on these estimated states, rather than measured or actual states of the drive device 208.

In an embodiment of the present invention, state estimation module 222 generates a plurality of estimated states based on the equations:

$\zeta(\lambda_j,k+1)=A\zeta(\lambda_j,k)+Bu(k)+L(y(k)-y'(k))$ $y'(k)=C\zeta(\lambda_j,k)+Du(k)$ wherein A represents a state transition matrix, k represents a discrete-time index, $\zeta(\lambda_j,k)$ represents the plurality of initialization states at k for other regions having a displacement $\lambda_j$, $\zeta(\lambda_j,k+1)$ represents the plurality of system states at k+1 for the other regions having a displacement $\lambda_j$, L represents an estimation matrix, y(k) represents at least one output of the drive device 208, y'(k) represents an estimate of at least one output of the drive device 208, u(k) represents at least one input to the drive device 208, and B, C, and D are system matrices.

As will be apparent to one skilled in the art, the control of controller 175 and/or 175' or estimation of state estimation module 222 can be implemented using closed form equations that utilize a limited number of multiplication operands. A simple initialization or calculation technique for the system states is presented that uses, for instance, a priori calibrated values. While the formulations above contemplate the same reference wedge being used for each harmonic, in an alternative embodiment of the present invention, different and not necessarily constant reference wedges can be used for one or more harmonics with appropriate changes being made to the equation notation above.

Figure 6:
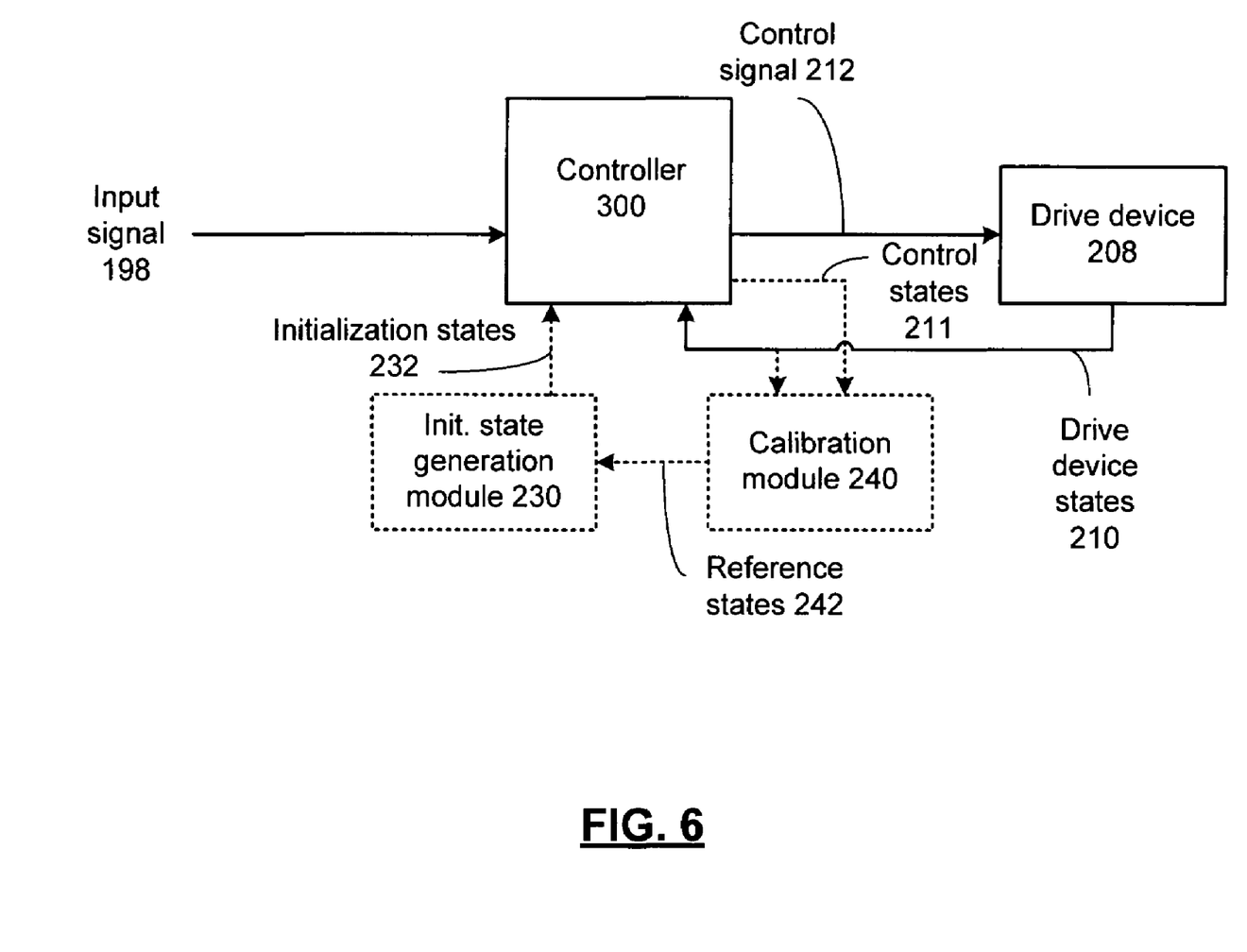
FIG. 6 presents a block diagram representation of a controller 300 in accordance with an embodiment of the present invention.

FIG. 6 presents a block diagram representation of a controller 300 in accordance with an embodiment of the present invention. In particular, controller 300 generates magnitudes, such as maximum absolute values, infinity norms, or other indicators of the maximum magnitude of the sinusoidal feedforward term for one or more harmonics of the sinusoidal disturbance. In an embodiment of the present invention, wherein n denotes the n'th sinusoidal harmonic, the magnitude of the sinusoidal feedforward term for one or more harmonics of the sinusoidal disturbance is calculated based on the following equation:

$$M(n) = \|GA^t(n)\zeta(t_0)\|_\infty$$

or $$M(n) = \sup_t |GA^t(n)\zeta(t_0)|$$

that can be calculated as $M(n)=((g_2^2+g_1^2\mu^2-2g_1g_2\mu\cos(2\pi n/\alpha))(\zeta_2^2+(\zeta_2\cot(2\pi n/\alpha)+\zeta_1\csc(2\pi n/\alpha)/\mu)^2))^{1/2}$ where the current states at time $t_0$ are given by:

$$\zeta(t_0) = \begin{bmatrix} \zeta_1 \\ \zeta_2 \end{bmatrix}$$

and $G = [g_1 \quad g_2]$ is a constant weighting matrix.

In addition, controller 300 optionally generates phases of the sinusoidal feedforward term for one or more harmonics of the sinusoidal disturbance. Considering the autonomous linear system represented by:

$GA^{t-t_0}\zeta(t_0)=M(n)\sin(2\pi n(t-t_0)/\alpha+\phi)$, with M(n)≠0, the phase $\phi$ can be represented as:

$\phi=\arctan((G\zeta(t_0))/((g_1\zeta_2\mu^2-g_2\zeta_1+(g_1\zeta_1-g_2\zeta_2)\mu\cos(2\pi n/\alpha))\csc(2\pi n/\alpha)/\mu))$ where arctan(y/x) returns the arc tangent value of y/x by additionally taking into account the quadrant of the Cartesian coordinate (x,y).

Controller 300 can include controller 175 or controller 175', or can be implemented using other control techniques in accordance with the broader scope of the present invention; however, control signal 212 is based in part on the magnitude and/or phase of the feedforward term for one or more harmonics of the sinusoidal disturbance.

Figure 7:
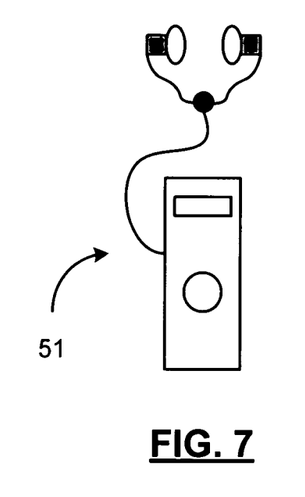
FIG. 7 presents a pictorial representation of a handheld audio unit 51 in accordance with an embodiment of the present invention.

FIG. 7 presents a pictorial representation of a handheld audio unit 51 in accordance with an embodiment of the present invention. In particular, disk drive unit 100 can include a small form factor magnetic hard disk whose disk 102 has a diameter 1.8" or smaller that is incorporated into or otherwise used by handheld audio unit 51 to provide general storage or storage of audio content such as motion picture expert group (MPEG) audio layer 3 (MP3) files or Windows Media Architecture (WMA) files, video content such as MPEG4 files for playback to a user, and/or any other type of information that may be stored in a digital format.

Figure 8:
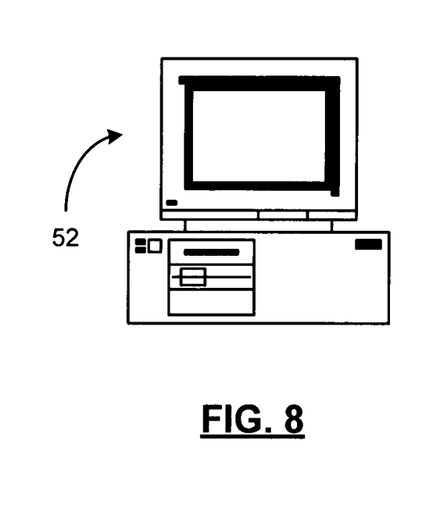
FIG. 8 presents a pictorial representation of a computer 52 in accordance with an embodiment of the present invention.

FIG. 8 presents a pictorial representation of a computer 52 in accordance with an embodiment of the present invention. In particular, disk drive unit 100 can include a small form factor magnetic hard disk whose disk 102 has a diameter 1.8" or smaller, a 2.5" or 3.5" drive or larger drive for applications such as enterprise storage applications. Disk drive 100 is incorporated into or otherwise used by computer 52 to provide general purpose storage for any type of information in digital format. Computer 52 can be a desktop computer, or an enterprise storage device such as a server, of a host computer that is attached to a storage array such as a redundant array of independent disks (RAID) array, storage router, edge router, storage switch and/or storage director.

Figure 9:
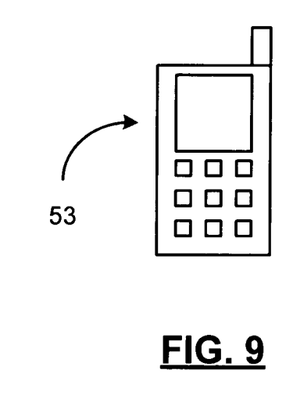
FIG. 9 presents a pictorial representation of a wireless communication device 53 in accordance with an embodiment of the present invention.

FIG. 9 presents a pictorial representation of a wireless communication device 53 in accordance with an embodiment of the present invention. In particular, disk drive unit 100 can include a small form factor magnetic hard disk whose disk 102 has a diameter 1.8" or smaller that is incorporated into or otherwise used by wireless communication device 53 to provide general storage or storage of audio content such as motion picture expert group (MPEG) audio layer 3 (MP3) files or Windows Media Architecture (WMA) files, video content such as MPEG4 files, JPEG (joint photographic expert group) files, bitmap files and files stored in other graphics formats that may be captured by an integrated camera or downloaded to the wireless communication device 53, emails, webpage information and other information downloaded from the Internet, address book information, and/or any other type of information that may be stored in a digital format.

In an embodiment of the present invention, wireless communication device 53 is capable of communicating via a wireless telephone network such as a cellular, personal communications service (PCS), general packet radio service (GPRS), global system for mobile communications (GSM), and integrated digital enhanced network (iDEN) or other wireless communications network capable of sending and receiving telephone calls. Further, wireless communication device 53 is capable of communicating via the Internet to access email, download content, access websites, and provide steaming audio and/or video programming. In this fashion, wireless communication device 53 can place and receive telephone calls, text messages such as emails, short message service (SMS) messages, pages and other data messages that can include attachments such as documents, audio files, video files, images and other graphics.

Figure 10:
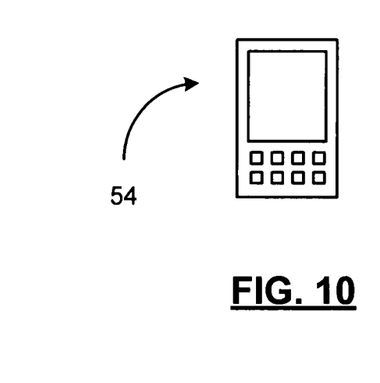
FIG. 10 presents a pictorial representation of a personal digital assistant 54 in accordance with an embodiment of the present invention.

FIG. 10 presents a pictorial representation of a personal digital assistant 54 in accordance with an embodiment of the present invention. In particular, disk drive unit 100 can include a small form factor magnetic hard disk whose disk 102 has a diameter 1.8" or smaller that is incorporated into or otherwise used by personal digital assistant 54 to provide general storage or storage of audio content such as motion picture expert group (MPEG) audio layer 3 (MP3) files or Windows Media Architecture (WMA) files, video content such as MPEG4 files, JPEG (joint photographic expert group) files, bitmap files and files stored in other graphics formats, emails, webpage information and other information downloaded from the Internet, address book information, and/or any other type of information that may be stored in a digital format.

Figure 11:
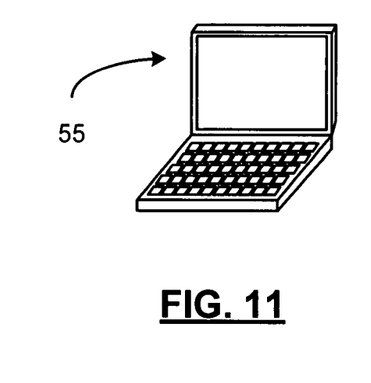
FIG. 11 presents a pictorial representation of a laptop computer 55 in accordance with an embodiment of the present invention.

FIG. 11 presents a pictorial representation of a laptop computer 55 in accordance with an embodiment of the present invention. In particular, disk drive unit 100 can include a small form factor magnetic hard disk whose disk 102 has a diameter 1.8" or smaller, or a 2.5" drive. Disk drive 100 is incorporated into or otherwise used by laptop computer 55 to provide general purpose storage for any type of information in digital format.

Figure 12:
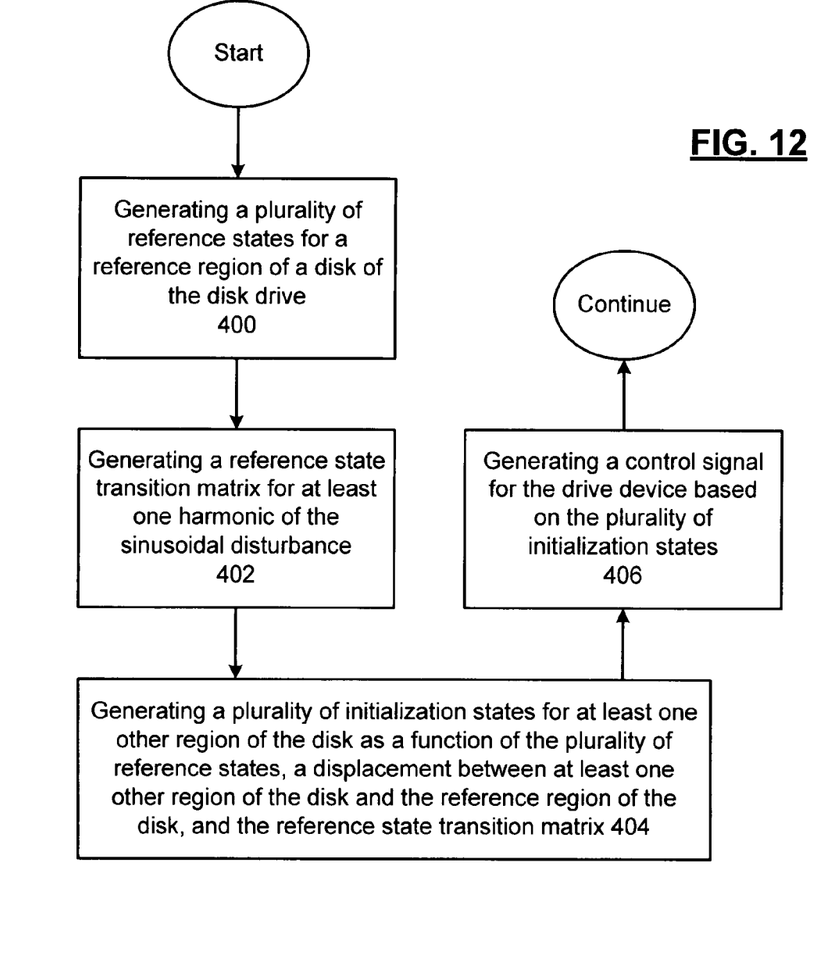
FIG. 12 presents a flowchart representation of a method in accordance with an embodiment of the present invention.

FIG. 12 presents a flowchart representation of a method in accordance with an embodiment of the present invention. In particular, a method is presented that can be used in conjunction with one or more of the features or functions described in association with FIGS. 1-11. In step 400, a plurality of reference states are generated for a reference region of a disk of the disk drive. In step 402, a reference state transition matrix is generated for at least one harmonic of the sinusoidal disturbance. In step 404, a plurality of initialization states are generated for at least one other region of the disk as a function of the plurality of reference states, a displacement between at least one other region of the disk and the reference region of the disk, and the reference state transition matrix. In step 406, a control signal is generated for the drive device based on the plurality of initialization states.

In an embodiment of the present invention, the reference region of the disk is defined by a head, wedge, and zone location, wherein the displacement between the other region of the disk and the reference region of the disk is calculated based on the wedge number of the other region within the same zone and with the same head.

In an embodiment, the step of generating the reference state transition matrix generates the reference state transition matrix for a plurality of harmonics of the sinusoidal disturbance. The step of generating the plurality of initialization states generates a plurality of initialization states based on the equation:

$$\zeta(\lambda_i,k)=A^{\lambda_i-\lambda_o}\zeta(\lambda_o,k)$$

wherein $A^{\lambda_i-\lambda_o}$ represents the reference state transition matrix for a displacement $\lambda_i-\lambda_o$, k represents a discrete-time index, $\zeta(\lambda_o,k)$ represents the plurality of reference states for the reference region having a displacement $\lambda_o$, and $\zeta(\lambda_i,k)$ represents the plurality of initialization states for the other region having a displacement $\lambda_i$. In this formulation, the reference state transition matrix can include at least one eigenvalue in common with the matrix:

$$A^\lambda(n) = \csc(2\pi n/a)\begin{bmatrix} \sin(2\pi n(\lambda+1)/\alpha) & \mu\sin(2\pi n\lambda/\alpha) \\ -\sin(2\pi n\lambda/\alpha)/\mu & \sin(2\pi n(1-\lambda)/\alpha) \end{bmatrix}$$

wherein both $\mu$ and $\alpha$ are non-zero constant values, $\lambda$ is a function of the displacement between at least one other region of the disk and the reference region of the disk, and wherein the plurality of harmonics of the sinusoidal disturbance includes the n'th harmonic.

Further, step 406 can generate a control signal that includes a feedforward control u(k) that is based on the following equations:

$$\zeta(\lambda_j, k+1) = A\zeta(\lambda_i, k) + By(k)$$

$$u(k) = K\zeta(\lambda_i, k) + Dy(k)$$

wherein A represents a state transition matrix, k represents a discrete-time index, $\zeta(\lambda_i, k)$ represents the plurality of initialization states at k for at least one other region having a displacement $\lambda_i$, $\zeta(\lambda_j, k+1)$ represents the plurality of system states at k+1 for at least one other region having a displacement $\lambda_j$, K represents a control matrix, y(k) represents at least one output of the drive device, u(k) represents at least one input to the drive device, and B and D are system matrices that can be obtained by standard state space control techniques. In this formulation, the state transition matrix can include at least one eigenvalue in common with the matrix:

$$A = \begin{bmatrix} 2\cos(2\pi n/\alpha) & \mu \\ -1/\mu & 0 \end{bmatrix}$$

wherein both μ and α are non-zero constant values and wherein the plurality of harmonics of the sinusoidal disturbance includes the n'th harmonic.

Figure 13:
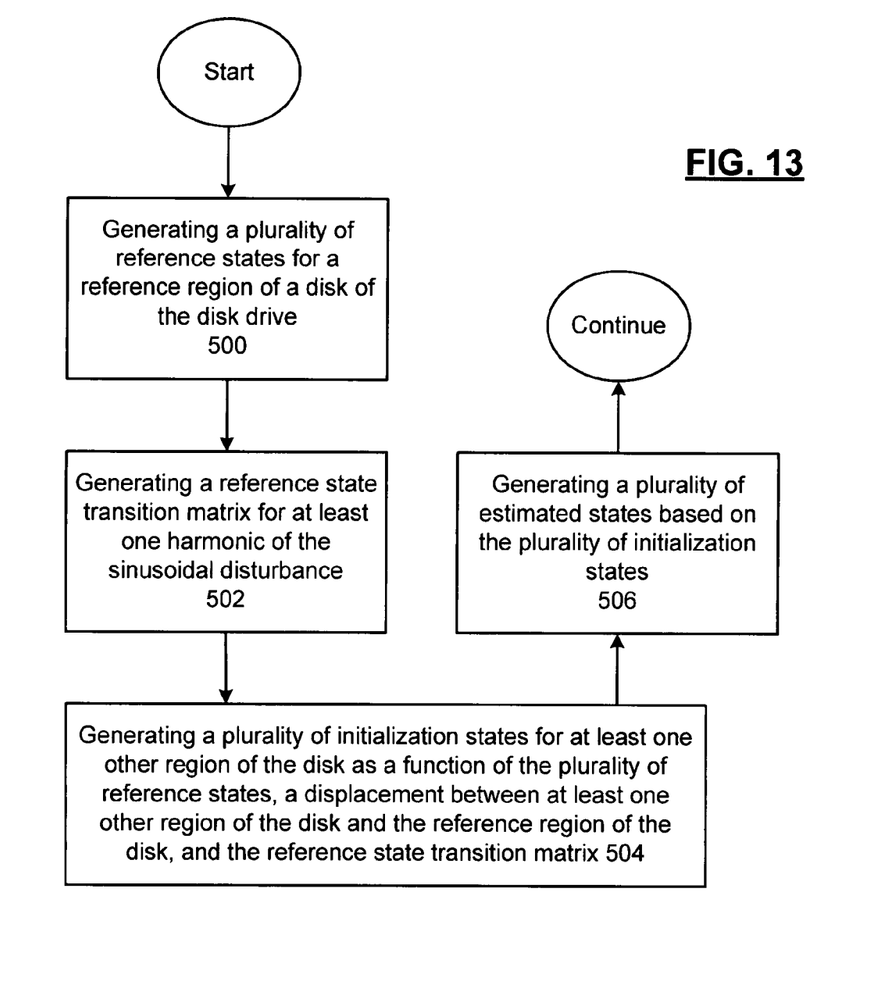
FIG. 13 presents a flowchart representation of a method in accordance with an embodiment of the present invention.

FIG. 13 presents a flowchart representation of a method in accordance with an embodiment of the present invention. A method is presented that can be used in conjunction with one or more of the features or functions described in association with FIGS. 1-12. In step 500, a plurality of reference states are generated for a reference region of a disk of a disk drive. In step 502, a reference state transition matrix is generated for at least one harmonic of the sinusoidal disturbance. In step 504, a plurality of initialization states are generated for at least one other region of the disk as a function of the plurality of reference states, a displacement between at least one other region of the disk and the reference region of the disk, and the reference state transition matrix. In step 506, a plurality of estimated states are generated based on the plurality of initialization states.

In an embodiment of the present invention, the reference region of the disk is defined by a head, wedge, and zone location, wherein the displacement between the other region of the disk and the reference region of the disk is calculated based on the wedge number of the other region within the same zone and with the same head.

In an embodiment, the step of generating the reference state transition matrix generates the reference state transition matrix for a plurality of harmonics of the sinusoidal disturbance. The step of generating the plurality of initialization states generates a plurality of initialization states based on the equation:

$$\zeta(\lambda_i, k) = A^{\lambda_i - \lambda_o} \zeta(\lambda_o, k)$$

wherein $A^{\lambda_i - \lambda_o}$ represents the reference state transition matrix for a displacement $\lambda_i - \lambda_o$, k represents a discrete-time index, $\zeta(\lambda_o, k)$ represents the plurality of reference states for the reference region having a displacement $\lambda_o$, and $\zeta(\lambda_i, k)$ represents the plurality of initialization states for the other region having a displacement $\lambda_i$. In this formulation, the reference state transition matrix can include at least one eigenvalue in common with the matrix:

$$A^\lambda(n) = \csc(2\pi n/\alpha) \begin{bmatrix} \sin(2\pi n(\lambda+1)/\alpha) & \mu\sin(2\pi n\lambda/\alpha) \\ -\sin(2\pi n\lambda/\alpha)/\mu & \sin(2\pi n(1-\lambda)/\alpha) \end{bmatrix}$$

wherein both μ and α are non-zero constant values, λ is a function of the displacement between at least one other region of the disk and the reference region of the disk, and wherein the plurality of harmonics of the sinusoidal disturbance includes the n'th harmonic.

In an embodiment, in step 506 a plurality of estimated states can be generated based on the equations:

$$\zeta(\lambda_j, k+1) = A\zeta(\lambda_i, k) + Bu(k) + L(y(k) - y'(k))$$

$$y'(k) = C\zeta(\lambda_i, k) + Du(k)$$

wherein A represents a state transition matrix, k represents a discrete-time index, $\zeta(\lambda_i, k)$ represents the plurality of initialization states at k for at least one other region having a displacement $\lambda_i$, $\zeta(\lambda_j, k+1)$ represents the plurality of system states at k+1 for at least one other region having a displacement $\lambda_j$, L represents an estimation matrix, y(k) represents at least one output of the drive device, y'(k) represents an estimate of at least one output of the drive device, u(k) represents at least one input to the drive device, and B, C, and D are system matrices.

Figure 14:
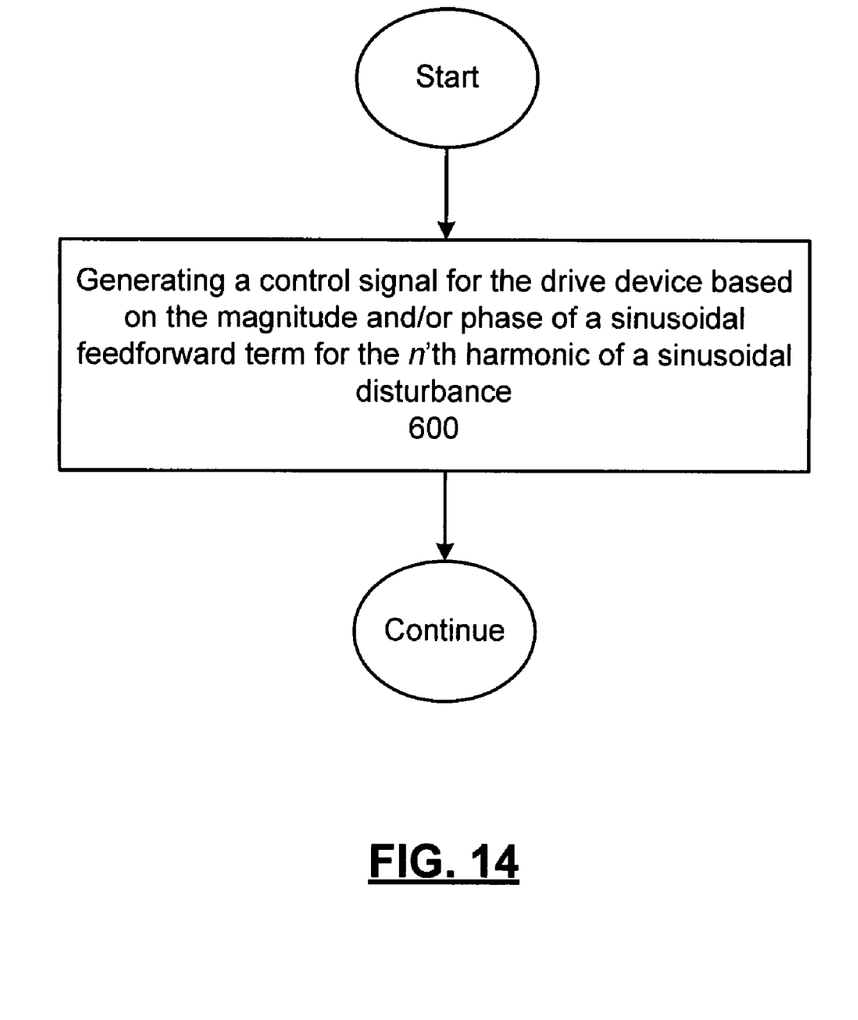
FIG. 14 presents a flowchart representation of a method in accordance with an embodiment of the present invention.

FIG. 14 presents a flowchart representation of a method in accordance with an embodiment of the present invention. A method is presented that can be used in conjunction with one or more of the features or functions described in association with FIGS. 1-13. In step 600, a control signal is generated for the drive device based on a magnitude of a sinusoidal feedforward term for the n'th harmonic of the sinusoidal disturbance based on the following equation:

$$M(n) = ((g_2^2 + g_1^2 \mu^2 - 2g_1 g_2 \mu \cos(2\pi n/\alpha))(\zeta_2^2 + (\zeta_2 \cot(2\pi n/\alpha) + \zeta_1 \csc(2\pi n/\alpha)/\mu)^2))^{1/2}$$

where the system states at time $t_0$ are given by:

$$\zeta(t_0) = \begin{bmatrix} \zeta_1 \\ \zeta_2 \end{bmatrix}$$

and $$G = [g_1 \quad g_2]$$

is a constant weighting matrix.

In an embodiment, step 600 includes generating the control signal based on a phase of a sinusoidal feedforward term for the n'th harmonic of the sinusoidal disturbance based on the following equation:

$$\phi = \arctan((G\zeta(t_0))/((g_1\zeta_2\mu^2 - g_2\zeta_1 + (g_1\zeta_1 - g_2\zeta_2)\mu\cos(2\pi n/\alpha))\csc(2\pi n/\alpha)/\mu)).$$

While the present invention has been described in terms of a magnetic disk, other nonmagnetic storage devices including optical disk drives including compact disk (CD) drives such as CD-R and CD-RW, digital video disk (DVD) drives such as DVD-R, DVD+R, DVD-RW, DVD+RW, etc. can likewise be implemented in accordance with the functions and features of the presented invention described herein.

Further, while the controller 175 has been described in terms of its use for controlling a drive device of a disk drive, such as a hard disk drive, controller 175 has many alternative uses in the control of a wide variety of other systems and devices.

As will be understood by one skilled in the art when presented the disclosure of the present invention, the various inputs and outputs can be scalar or vector quantities depending on the number of inputs and number of outputs, and the dimensionality of the various matrices presented herein can depend on the number of inputs, the number of outputs, the number of states, and the number of harmonics of the sinusoidal disturbances that are considered.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The various circuit components can be implemented using 0.35 micron or smaller CMOS technology. However, other circuit technologies, including both integrated and/or non-integrated types, may be used within the broad scope of the present invention. Likewise, various embodiments described herein can also be implemented as software programs running on a computer processor. It should also be noted that the software implementations of the present invention can be stored on a tangible storage medium such as a magnetic or optical disk, read-only memory or random access memory and also be produced as an article of manufacture.

Thus, there has been described herein an apparatus and method, as well as several embodiments including a preferred embodiment, for implementing a controller for controlling a system such as a drive device of a disk drive and a state estimator that optionally can be used therein. Control or estimation can be implemented using closed form equations that utilize a limited number of multiplication operands. A simple initialization or calculation technique for the system states is presented that uses, for instance, a priori calibrated values. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A controller for use in controlling a drive device of a disk drive in the presence of sinusoidal disturbances, the controller comprising:
a calibration module that generates a plurality of reference states for a reference region of a disk of the disk drive;
an initialization state generation module, coupled to the calibration module, that generates a plurality of initialization states for at least one other region of the disk as a function of the plurality of reference states, a displacement between the at least one other region of the disk and the reference region of the disk, and a reference state transition matrix; and
a control module, coupled to the initialization state generation module, that generates a control signal for the drive device based on the plurality of initialization states.

2. The controller of claim 1 wherein the reference region of the disk is defined by a head, wedge, and zone location.

3. The controller of claim 1 wherein the displacement between the at least one other region of the disk and the reference region of the disk is calculated based on a wedge number of the at least one other region.

4. The controller of claim 1 further comprising:
a state transition matrix generation module, coupled to the initialization state generation module, that generates the reference state transition matrix for a plurality of harmonics of the sinusoidal disturbance.

5. The controller of claim 1 wherein the initialization state generation module generates a plurality of initialization states based on the equation:

$$\zeta(\lambda_i,k) = A^{\lambda_i - \lambda_o} \zeta(\lambda_o,k)$$

wherein $A^{\lambda_i - \lambda_o}$ represents the reference state transition matrix for a displacement $\lambda_i - \lambda_o$, k represents a discrete-time index, $\zeta(\lambda_o,k)$ represents the plurality of reference states for the reference region having a displacement $\lambda_o$, and $\zeta(\lambda_i,k)$ represents the plurality of initialization states for the at least one other region having a displacement $\lambda_i$.

6. The controller of claim 5 wherein the reference state transition matrix includes at least one eigenvalue in common with the matrix:

$$A^\lambda(n) = \csc(2\pi n/\alpha) \begin{bmatrix} \sin(2\pi n(\lambda+1)/\alpha) & \mu\sin(2\pi n\lambda/\alpha) \\ -\sin(2\pi n\lambda/\alpha)/\mu & \sin(2\pi n(1-\lambda)/\alpha) \end{bmatrix}$$

wherein both $\mu$ and $\alpha$ are non-zero constant values, $\lambda$ is a function of the displacement between the at least one other region of the disk and the reference region of the disk, and wherein the plurality of harmonics of the sinusoidal disturbance includes the n'th harmonic.

7. The controller of claim 1 wherein the control module generates a control signal based on the following equations:

$$\zeta(\lambda_j,k+1) = A\zeta(\lambda_i,k) + By(k)$$

$$u(k) = K\zeta(\lambda_i,k) + Dy(k)$$

wherein A represents a state transition matrix, k represents a discrete-time index, $\zeta(\lambda_i,k)$ represents the plurality of initialization states at k for the at least one other region having a displacement $\lambda_i$, $\zeta(\lambda_j,k+1)$ represents a plurality of system states at k+1 for the at least one other region having a displacement $\lambda_j$, K represents a control matrix, y(k) represents at least one output of the drive device, u(k) represents at least one input to the drive device, and B and D are system matrices.

8. The controller of claim 7 wherein the state transition matrix includes at least one eigenvalue in common with the matrix:

$$A = \begin{bmatrix} 2\cos(2\pi n/\alpha) & \mu \\ -1/\mu & 0 \end{bmatrix}$$

wherein both $\mu$ and $\alpha$ are non-zero constant values and wherein the plurality of harmonics of the sinusoidal disturbance includes the n'th harmonic.

9. The controller of claim 1 wherein the drive device includes an actuator for controlling the position of at least one read/write head of a disk drive.

10. The controller of claim 1 wherein the controller module further includes a state estimation module that generates a plurality of estimated states based on the equations:

$$\zeta(\lambda_j,k+1)=A\zeta(\lambda_i,k)+Bu(k)+L(y(k)-y'(k))$$

$$y'(k)=C\zeta(\lambda_i,k)+Du(k)$$

wherein A represents a state transition matrix, k represents a discrete-time index, $\zeta(\lambda_i,k)$ represents the plurality of initialization states at k for the at least one other region having a displacement $\lambda_i$, $\zeta(\lambda_j,k+1)$ represents a plurality of system states at k+1 for the at least one other region having a displacement $\lambda_j$, L represents an estimation matrix, y(k) represents at least one output of the drive device, y'(k) represents an estimate of at least one output of the drive device, u(k) represents at least one input to the drive device, and B, C, and D are system matrices.

11. A method for use in controlling a drive device of a disk drive in the presence of sinusoidal disturbances, the method comprising:
    generating a plurality of reference states for a reference region of a disk of the disk drive;
    generating a reference state transition matrix for at least one harmonic of the sinusoidal disturbance;
    generating a plurality of initialization states for at least one other region of the disk as a function of the plurality of reference states, a displacement between the at least one other region of the disk and the reference region of the disk, and the reference state transition matrix; and
    generating a control signal for the drive device based on the plurality of initialization states.

12. The method of claim 11 wherein the reference region of the disk is defined by a head, wedge, and zone location.

13. The method of claim 11 wherein the displacement between the at least one other region of the disk and the reference region of the disk is calculated based on the wedge number of the at least one other region.

14. The method of claim 11 wherein the step of generating the reference state transition matrix generates the reference state transition matrix for a plurality of harmonics of the sinusoidal disturbance.

15. The method of claim 11 wherein the step of generating the plurality of initialization states generates a plurality of initialization states based on the equation:

$$\zeta(\lambda_i,k)=A^{\lambda_i-\lambda_o}\zeta(\lambda_o,k)$$

wherein $A^{\lambda_i-\lambda_o}$ represents the reference state transition matrix for a displacement $\lambda_i-\lambda_o$, k represents a discrete-time index, $\zeta(\lambda_o,k)$ represents the plurality of reference states for the reference region having a displacement $\lambda_o$, and $\zeta(\lambda_i,k)$ represents the plurality of initialization states for the at least one other region having a displacement $\lambda_i$.

16. The method of claim 15 wherein the reference state transition matrix includes at least one eigenvalue in common with the matrix:

$$A^\lambda(n) = \csc(2\pi n/\alpha)\begin{bmatrix} \sin(2\pi n(\lambda+1)/\alpha) & \mu\sin(2\pi n\lambda/\alpha) \\ -\sin(2\pi n\lambda/\alpha)/\mu & \sin(2\pi n(1-\lambda)/\alpha) \end{bmatrix}$$

wherein both $\mu$ and $\alpha$ are non-zero constant values, $\lambda$ is a function of the displacement between the at least one other region of the disk and the reference region of the disk, and wherein the plurality of harmonics of the sinusoidal disturbance includes the n'th harmonic.

17. The method of claim 11 wherein the step of generating a control signal generates a control signal based on the following equations:

$$\zeta(\lambda_j,k+1)=A\zeta(\lambda_i,k)+By(k)$$

$$u(k)=K\zeta(\lambda_i,k)+Dy(k)$$

wherein A represents a state transition matrix, k represents a discrete-time index, $\zeta(\lambda_i,k)$ represents the plurality of initialization states at k for the at least one other region having a displacement $\lambda_i$, $\zeta(\lambda_j,k+1)$ represents a plurality of system states at k+1 for the at least one other region having a displacement $\lambda_j$, K represents a control matrix, y(k) represents at least one output of the drive device, u(k) represents at least one input to the drive device, and B and D are system matrices.

18. The method of claim 17 wherein the state transition matrix includes at least one eigenvalue in common with the matrix:

$$A = \begin{bmatrix} 2\cos(2\pi n/\alpha) & \mu \\ -1/\mu & 0 \end{bmatrix}$$

wherein both $\mu$ and $\alpha$ are non-zero constant values and wherein the plurality of harmonics of the sinusoidal disturbance includes the n'th harmonic.

19. The method of claim 11 further comprising the step of:
    generating a plurality of estimated states based on the equations:

$$\zeta(\lambda_j,k+1)=A\zeta(\lambda_i,k)+Bu(k)+L(y(k)-y'(k))$$

$$y'(k)=C\zeta(\lambda_i,k)+Du(k)$$

wherein A represents a state transition matrix, k represents a discrete-time index, $\zeta(\lambda_i,k)$ represents the plurality of initialization states at k for the at least one other region having a displacement $\lambda_i$, $\zeta(\lambda_j,k+1)$ represents the plurality of system states at k+1 for the at least one other region having a displacement $\lambda_j$, L represents an estimation matrix, y(k) represents at least one output of the drive device, y'(k) represents an estimate of at least one output of the drive device, u(k) represents at least one input to the drive device, and B, C, and D are system matrices.

20. A method for use in a disk drive in the presence of sinusoidal disturbances, the method comprising:
    generating a plurality of reference states for a reference region of a disk of the disk drive;
    generating a reference state transition matrix for at least one harmonic of the sinusoidal disturbance;

generating a plurality of initialization states for at least one other region of the disk as a function of the plurality of reference states, a displacement between the at least one other region of the disk and the reference region of the disk, and the reference state transition matrix; and generating a plurality of estimated states based on the plurality of initialization states.

21. The method of claim 20 wherein the reference region of the disk is defined by a head, wedge, and zone location.

22. The method of claim 20 wherein the displacement between the at least one other region of the disk and the reference region of the disk is calculated based on a wedge number of the at least one other region.

23. The method of claim 20 wherein the step of generating the plurality of initialization states generates a plurality of initialization states based on the equation:

$$\zeta(\lambda_i,k) = A^{\lambda_i - \lambda_o}\zeta(\lambda_o,k)$$

wherein $A^{\lambda_i - \lambda_o}$ represents the reference state transition matrix for a displacement $\lambda_i - \lambda_o$, k represents a discrete-time index, $\zeta(\lambda_o,k)$ represents the plurality of reference states for the reference region having a displacement $\lambda_o$, and $\zeta(\lambda_i,k)$ represents the plurality of initialization states for the at least one other region having a displacement $\lambda_i$.

24. The method of claim 23 wherein the reference state transition matrix includes at least one eigenvalue in common with the matrix:

$$A^\lambda(n) = \csc(2\pi n/\alpha)\begin{bmatrix} \sin(2\pi n(\lambda+1)/\alpha) & \mu\sin(2\pi n\lambda/\alpha) \\ -\sin(2\pi n\lambda/\alpha)/\mu & \sin(2\pi n(1-\lambda)/\alpha) \end{bmatrix}$$

wherein both $\mu$ and $\alpha$ are non-zero constant values, $\lambda$ is a function of the displacement between the at least one other region of the disk and the reference region of the disk, and wherein the plurality of harmonics of the sinusoidal disturbance includes the n'th harmonic.

25. The method of claim 20 wherein the step of generating the plurality of estimated states generates a plurality of estimated states based on the equations:

$$\zeta(\lambda_j,k+1) = A\zeta(\lambda_i,k) + Bu(k) + L(y(k)-y'(k))$$

$$y'(k) = C\zeta(\lambda_i,k) + Du(k)$$

wherein A represents a state transition matrix, k represents a discrete-time index, $\zeta(\lambda_i,k)$ represents the plurality of initialization states at k for the at least one other region having a displacement, $\lambda_i$, $\zeta(\lambda_j,k+1)$ represents a plurality of system states at k+1 for the at least one other region having a displacement $\lambda_j$, L represents an estimation matrix, y(k) represents at least one output of the disk drive, y'(k) represents an estimate of at least one output of the drive device, u(k) represents at least one input to the drive device, and B, C, and D are system matrices, and wherein the method further comprises the step of:

generating the control signal based on the plurality of estimated states.

26. The method of claim 25 wherein the state transition matrix includes at least one eigenvalue in common with the matrix:

$$A = \begin{bmatrix} 2\cos(2\pi n/\alpha) & \mu \\ -1/\mu & 0 \end{bmatrix}$$

wherein both $\mu$ and $\alpha$ are non-zero constant values and wherein the plurality of harmonics of the sinusoidal disturbance includes the n'th harmonic.

27. A controller for use in controlling a drive device of a disk drive in the presence of sinusoidal disturbances, the controller comprising:

a control module that generates a control signal for the drive device based on a magnitude of a sinusoidal feedforward term, M(n), for an n'th harmonic of the sinusoidal disturbances based on the following equation:

$$M(n) = ((g_2^2 + g_1^2\mu^2 - 2g_1g_2\mu\cos(2\pi n/\alpha))(\zeta_2^2 + (\zeta_2\cot(2\pi n/\alpha) + \zeta_1\csc(2\pi n/\alpha)/\mu)^2))^{1/2}$$

where system states at time $t_0$ are given by:

$$\zeta(t_0) = \begin{bmatrix} \zeta_1 \\ \zeta_2 \end{bmatrix}$$

and $$G = [g_1 \ g_2]$$

is a constant weighting matrix and wherein both $\mu$ and $\alpha$ are non-zero constant values.

28. The controller of claim 27 wherein the control module generates a control signal for the drive device based on a phase of a sinusoidal feedforward term, M(n), for the n'th harmonic of the sinusoidal disturbances based on the following equation:

$$\phi = \arctan((G\zeta(t_0))/((g_1\zeta_2\mu^2 - g_2\zeta_1 + (g_1\zeta_1 - g_2\zeta_2)\mu\cos(2\pi n/\alpha))\csc(2\pi n/\alpha)/\mu)).$$

29. A method for use in controlling a drive device of a disk drive in the presence of sinusoidal disturbances, the method comprising:

generating a control signal for the drive device based on a magnitude of a sinusoidal feedforward term for an n'th harmonic of the sinusoidal disturbances based on the following equation:

$$M(n) = ((g_2^2 + g_1^2\mu^2 - 2g_1g_2\mu\cos(2\pi n/\alpha))(\zeta_2^2 + (\zeta_2\cot(2\pi n/\alpha) + \zeta_1\csc(2\pi n/\alpha)/\mu)^2))^{1/2}$$

where system states at time $t_0$ are given by:

$$\zeta(t_0) = \begin{bmatrix} \zeta_1 \\ \zeta_2 \end{bmatrix}$$

and $$G = [g_1 \ g_2]$$

is a constant weighting matrix and wherein both $\mu$ and $\alpha$ are non-zero constant values.

30. The controller of claim 29 wherein the step of generating a control signal for the drive device includes generating the control signal based on a phase of a sinusoidal feedforward term for the n'th harmonic of the sinusoidal disturbances based on the following equation:

$$\phi = \arctan((G\zeta(t_0))/((g_1\zeta_2\mu^2 - g_2\zeta_1 + (g_1\zeta_1 - g_2\zeta_2)\mu\cos(2\pi n/\alpha))\csc(2\pi n/\alpha)/\mu)).$$

* * * * *